Nov. 26, 1935.  S. S. SVENDSEN  2,022,012
MANUFACTURE OF ALUMS
Filed Feb. 3, 1930
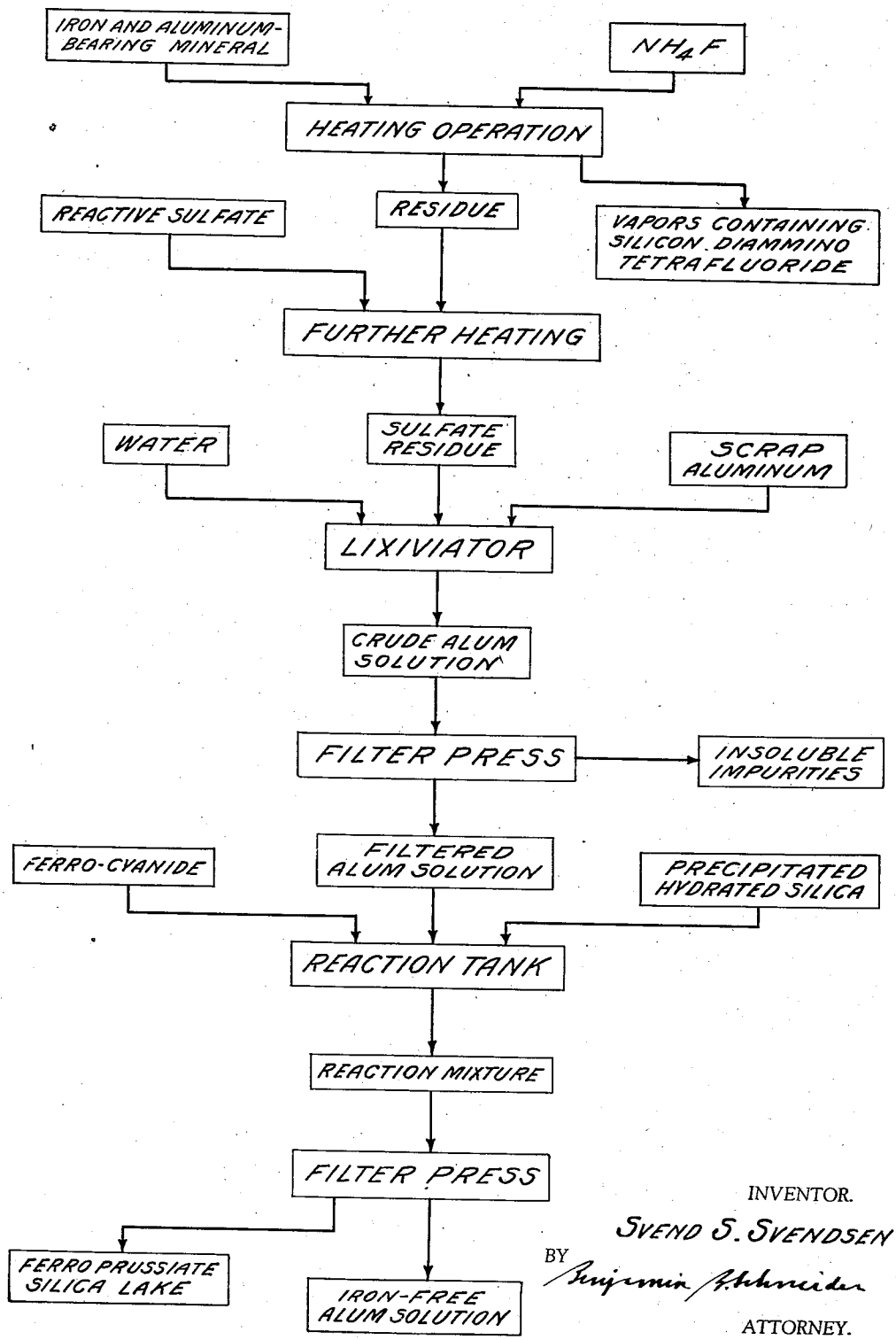
INVENTOR.
Svend S. Svendsen
BY
ATTORNEY.

Patented Nov. 26, 1935

2,022,012

UNITED STATES PATENT OFFICE 2,022,012

MANUFACTURE OF ALUMS

Svend S. Svendsen, Chicago, Ill., assignor to Clay Reduction Company, a corporation of Illinois Application February 3, 1930, Serial No. 425,672

22 Claims. (Cl. 23—118)

This invention relates to production of alums from silicious oxygen compounds containing metallic oxides forming tri-valent double sulfates with alkali sulfates. I contemplate forming alums of such metals as chromium, molybdenum, cobalt, etc., and especially the aluminum alums. The silicious oxygen compounds which may be used include orthoclase feldspar, leucite, and in particular clays such as fire clay, diaspore, kaolin and bauxites. The invention is illustrated in one form in the accompanying drawing, in which the figure shows a flow sheet of a procedure effective in carrying out the invention.

In my prior and copending applications Serial No. 304,617 filed September 7, 1928, of which this application is a division in part, and Serial No. 425,345 filed February 1, 1930, issued as Patent No. 1,911,004 on May 23, 1933, I have described and claimed a process for treating silicious compounds containing metallic oxides wherein the compounds are treated with ammonium fluoride and the mixture heated to produce and volatilize ammonia-silicon-fluorine compounds, leaving metallic compounds to be worked up into other valuable products.

In accordance with the present invention minerals or other compounds comprising a silicious oxygen compound containing an alum-forming tri-valent base, and particularly alumina, are mixed and heated with ammonium fluoride or ammonium bifluoride or substances which yield the same under the conditions of the reaction, whereby all or a substantial part of the silica is volatilized. The residue is converted into anhydrous alum by heating with a reactive sulfate in the quantity needed to form the tri-valent component of the double sulfate, the necessary monovalent sulfate being present in a quantity sufficient for the formation of alum.

By the term "mono-valent sulfate" I intend to designate a normal sulfate of the alkali metals and of ammonium as well as compounds, which, under the conditions of the reaction, form such normal sulfate, such as bases of the alkali metals reacting with a reactive sulfate. By the term "reactive sulfate" I intend to designate one which under the conditions of the reaction parts with its sulfuric acid $(SO_4)$ radical to form a metallic sulfate. In this application sulfuric acid, ammonium sulfate and bisulfate, and the bisulfates of the alkali metals are regarded as reactive sulfates, as will become apparent as the process is explained further. By the term "ammonium fluoride" I intend to designate the normal fluoride and the bifluoride as well as substances which yield ammonium fluoride under the conditions of the reaction such as mixtures of metallic fluorides and ammonium sulfate.

Metallic fluorides, ammonium silico-fluoride, silicon diammino tetrafluoride, ammonia, and water are formed when ammonium fluoride is heated to about 200° to 330° C. and preferably to above about 230° C. with silicious oxygen compounds containing metallic oxides, either free and/or combined with silica, as indicated in the equations hereinafter given. Under these conditions, water in the liquid state is not permitted to be present and the reaction hence takes place in the dry way or state. In accordance with my present invention such metallic fluorides as are formed, together with the balance of the metallic oxygen compounds, are decomposed by the action of a reactive sulfate added in quantity sufficient to materially convert these metallic compounds into sulfates in the presence of sufficient mono-valent sulfate to form an alum. The alum is separated, suitably by leaching and crystallization.

It is desirable that any iron present be converted into the ferrous form prior to the crystallization of the alum. This may be done by reduction in the alum solution after leaching, as with scrap aluminum, or the reduction may be effected by passing a reducing gas such as carbon monoxide, hydrogen or gases containing them through the finely divided mineral at temperatures of the order of 400° C. before the mineral is treated with ammonium fluoride. Oxidation during the further steps of the process, as during solution and crystallization, should be avoided.

A reactive sulfate alone attacks the metallic oxide of a silicious oxygen compound containing such an oxide more or less according to the nature of the compound. A reactive sulfate acting either simultaneously with ammonium fluoride or after the ammonium fluoride has reacted with the silicon of the silicious compound, however, substantially completely decomposes the silicious compound, and especially compounds that have a substantial silica content, the silicon present being volatilized mostly or entirely as silicon diammino tetrafluoride and the other metallic oxides being substantially completely sulfated. Any excess ammonium fluoride forms volatile fluorine compounds. However, an excess of ammonium fluoride may be used advantageously with compounds low in silica such as high grade bauxites. I have found that an excess of fluoride over that needed to combine with the silica of low silica compounds helps the sulfating reaction so that substantially all of the metallic oxide is converted into the sulfate. If the reactive sulfate is sulfuric acid it is preferably added after the silicon diammino tetra-fluoride is volatilized.

The minimum temperature needed to convert into sulfates such metallic fluorides as are formed in the first stage of reaction is about 280° C. to 330° C. when a silicious compound is present, although with some clays it may be lower, say about 250° C. Reduction of sulfuric acid to sulfurous acid by organic matter which may be present in the raw materials starts above about 330° C. Above 350° C. ammonia starts to act as a reducing agent. At about 400° C. silicon diammino tetrafluoride starts to decompose into hydrogen fluoride and a silicon nitrogen compound. For these reasons the temperature preferably should not exceed about 350° C.

Although the ammonium fluoride may be added to the silicious compound in aqueous solution and the water evaporated therefrom, it is preferably added gradually in dry form to the raw material heated above 100° C. The water formed in the process is then evolved as a vapor and caking of the charge caused by condensing of water evolved in the process is prevented. The ammonium fluoride may also be supplied as a vapor.

If titanium is present in the silicious oxygen type and supplied with mixing means, the am-ammonia compound which is very similar to the corresponding silicon compound. Sufficient ammonium fluoride should be used to volatilize all of the reactive silica as well as the titanium to remove these. Quartz is not substantially attacked by ammonium fluoride unless first heated to a bright red heat and chilled.

The invention will be understood more fully from the following typical examples:

Example I

Ammonia alum is produced from kaolin, using ammonium fluoride as the reactive fluoride and ammonium sulfate as the reactive sulfate in the proportions required by the equations hereinafter given.

In a suitable furnace, preferably of the muffle type and supplied with mixing means, the ammonium sulfate is first preheated and dried. When the sulfate is thoroughly dry, kaolin, which may have been previously calcined at from 600° C. to 900° C., and preferably from 650° C. to 850° C., is added and mixed with the sulfate. After the temperature has reached 150° C. the ammonium fluoride is gradually added and the temperature is gradually raised to 230° to 350° C. to vaporize silicon diammino tetrafluoride. By proper stirring with sufficient addition of heat the temperature remains below 350° C. until the main part of the reaction is finished. Toward the end of the reaction less heat is needed and the temperature rises if not properly controlled. The temperature should not be allowed to rise above 350° C. to prevent losses as previously explained.

The sulfate residue is removed from the furnace by an air locked conveyor and alum dissolved by lixiviation, and freed from insoluble matter, as by hot filtration through a pressure filter. A filter-aid such as precipitated hydrated silica derived from the silicon diammino tetrafluoride may be used to aid the filtration. The alum crystallizes out on cooling. In an alternative method of operation the alum of the sulfate residue may be dissolved by lixiviation with a minimum of hot water, and crystallized by cooling. The crystals may then be worked to remove colloid impurities and the worked crystals redissolved and again crystallized. The mother liquor is reused in the lixiviation of sulfate residue. Iron present in the clay is partly dissolved in the alum solution. It is desirable to have this iron present in the ferrous state during the crystallization of the alum. Any ferric iron present may be reduced by means of scrap aluminum supplied in the hot alum liquor. During filtration and crystallization the alum solution should be protected from contact with the air to prevent reoxidation of the ferrous iron. The iron is substantially left in the mother liquor. If sufficient excess ammonium sulfate is present to form ferrous ammonium sulfate with the ferrous sulfate, the ferrous iron is not oxidized readily by the oxygen of the air.

From the mother liquor iron salts may be eliminated as prussiate by treating with a ferro-cyanide solution, the iron being oxidized either before or after the ferro-cyanide addition as is well known to those skilled in the art. I have discovered, however, that it is possible to form valuable and easily filtered blue silica lakes with the prussiate formed by depositing it on precipitated hydrated silica. This may be formed by decomposing the silicon diammino tetrafluoride with water and ammonia as hereinafter described. To secure the best results the freshly precipitated washed silica is added to the mother liquor and thoroughly agitated therewith before the addition of the ferro-cyanide. Hot precipitation in slightly acid solution seems to be advantageous.

The iron also may be eliminated as a prussiate lake from the alum solution before crystallization by addition of ferro-cyanide and precipitated hydrated silica as previously explained. The purified alum solution is then crystallized.

The alum may be used for the production of aluminum hydrate, preferably using ammonia liberated in the process for the precipitation, thereby regenerating ammonium sulfate for reuse in the furnace.

The vapors generated in the furnace, including the silicon diammino tetrafluoride, ammonia, and water, are mixed. Any solids which the vapors may carry over may be separated in a Cottrell precipitator. The silicon diammino tetrafluoride is prevented from condensing to a solid by keeping the vapors at a temperature above 230° C. The vapors are then cooled in a condensing or precipitating chamber to a temperature between 100° C. and 230° C., whereby the silicon diammino tetrafluoride is precipitated and the sublimate collected. The ammonia and water vapors pass through and are collected by condensation, the tail gases being treated in a sulfuric acid scrubber. Preferably, however, the combined vapors are subjected to the action of water to decompose the silicon diammino tetrafluoride into precipitated hydrated silica and ammonium fluoride which may be recovered and again used in the process. At below 34° C. this reaction is complete. The reaction follows:

(1) $SiF_4.2NH_3 + 2NH_3 + 2H_2O = SiO_2 + 4NH_4F$

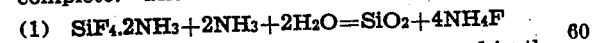

The furnace reactions may be expressed in the following schematic equations:

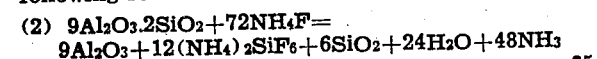

(2) $9Al_2O_3.2SiO_2 + 72NH_4F =$
    $9Al_2O_3 + 12(NH_4)_2SiF_6 + 6SiO_2 + 24H_2O + 48NH_3$

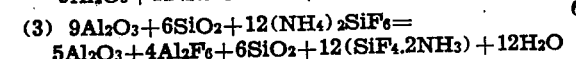

(3) $9Al_2O_3 + 6SiO_2 + 12(NH_4)_2SiF_6 =$
    $5Al_2O_3 + 4Al_2F_6 + 6SiO_2 + 12(SiF_4.2NH_3) + 12H_2O$

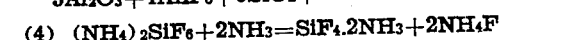

(4) $(NH_4)_2SiF_6 + 2NH_3 = SiF_4.2NH_3 + 2NH_4F$

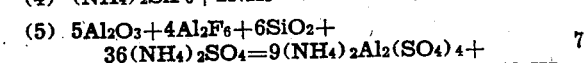

(5) $5Al_2O_3 + 4Al_2F_6 + 6SiO_2 +$
    $36(NH_4)_2SO_4 = 9(NH_4)_2Al_2(SO_4)_4 +$
    $6(SiF_4.2NH_3) + 27H_2O + 42NH_3$ or in contracted form:

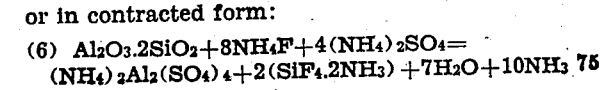

(6) $Al_2O_3.2SiO_2 + 8NH_4F + 4(NH_4)_2SO_4 =$
    $(NH_4)_2Al_2(SO_4)_4 + 2(SiF_4.2NH_3) + 7H_2O + 10NH_3$

In the above example, although the ammonium fluoride addition was made after the ammonium sulfate addition, it is immaterial what sequence is used in adding these chemicals since the ammonium sulfate reaction is subsequent to the ammonium fluoride reaction as is indicated in the above equations.

The procedure above described is illustrated in the flow sheet shown in the accompanying drawing. Since, as hereinbefore stated, the ammonium sulfate reaction which takes place is subsequent to the ammonium fluoride reaction, in the flow sheet the point of effective action of the reactive sulfate is shown as subsequent to the heating and reaction with ammonium fluoride, although, as pointed out above, the time of physical admixture of the reactive sulfate is not material.

As pointed out hereinbefore, the elimination of the iron may be effected after or before crystallization of alum from the alum-containing solution. In the flow sheet illustrated in the drawing, removal of the iron is effected before crystallization, the steps shown on the flow sheet terminating with the production of the iron-free alum solution.

*Example II*

Potash alum is produced from orthoclase feldspar, using calcium fluoride with ammonium sulfate as the reactive fluoride and sulfuric acid as the reactive sulfate. The furnace and apparatus of Example I may be used to carry out these reactions.

The finely pulverized feldspar is mixed with finely pulverized fluorspar and ammonium sulfate in a quantity sufficient to supply the required proportion of ammonium fluoride and heated to about 280° C. to 330° C. to vaporize silicon diammino-tetrafluoride. The charge, while heated to near the boiling point of sufuric acid, is treated with sulfuric acid in a quantity sufficient to convert metallic compounds present into sulfates. The acid is preferably added gradually. In this case the mono-valent sulfate necessary to form an alum is formed under the conditions of the reaction from the alkali base of the silicate and sulfate radical-supplying compounds present. The reaction may be expressed by the following contracted final equation:

(7) $K_2O.Al_2O_3.6SiO_2 + 12CaF_2 + 12(NH_4)_2SO_4 + 4H_2SO_4 = K_2SO_4.Al_2(SO_4)_3 + 12CaSO_4 + 6(SiF_4.2NH_3)16H_2O + 12NH_3$

As in Example I the silicon diammino tetra-fluoride vapors may be utilized in the production of precipitated hydrated silica and fluorine compounds. The alum is dissolved from the sulfate residue by lixiviation, freed from insoluble matter by hot filtration through a pressure filter and removed from solution by crystallization. As in Example I, iron may be removed as Prussian blue lake.

*Example III*

Soda alum is produced from bauxite, using ammonium fluoride as the reactive fluoride and sodium bisulfate and sulfuric acid as the reactive sulfates in the proportions required by the equations hereinafter given:

The bauxite or bauxitic clay, these terms being used synonymously, which may be of low or high grade, is calcined at between about 375° C. and 600° C., preferably between 400° C. and 500° C. to make it more reactive. It is treated in a furnace as described in Example I. Sufficient ammonium fluoride is added to the bauxite to substantially completely volatilize the silicon and titanium present as fluoride ammonia compounds of these metals. These compounds may be recovered and treated as previously described to recover the ammonium fluoride and produce precipitated hydrated silica and titania. Sodium sulfate is added to the reaction mass either before or after the ammonium fluoride addition or simultaneously therewith in quantity sufficient to form soda alum with the aluminum sulfate formed. Then sulfuric acid in quantity sufficient to form aluminum sulfate with the alumina is added to the reaction mass, preferably gradually with constant stirring. A 60° Bé. acid is suitable. Since metallic fluoride is formed in the reaction of the bauxite with ammonium fluoride, there is an evolution of fluorine compound. Due to the presence of undecomposed silicious compound, silicon fluoride is formed. The heating is continued until the reaction is complete. The silicon fluoride which is formed by the action of the acid is preferably collected with the previously evolved vapors containing ammonia, thereby forming silicon diammino tetrafluoride. The vapors are treated as described in Example I.

Although sodium sulfate and sulfuric acid are described as having been employed, it is possible to employ the bisulfate, especially in the form of the commercially available niter cake, due allowance being made for the unsaturated acid.

(8) $Al_2O_3 + Na_2SO_4 + 3H_2SO_4 = Na_2SO_4.Al_2(SO_4)_3 + 3H_2O$

In Examples II and III ammonium sulfate may be substituted for the sulfuric acid. The reactions then will be:

(9) $K_2O.Al_2O_3.6SiO_2 + 12CaF_2 + 16(NH_4)_2SO_4 = K_2SO_4.Al_2(SO_4)_3 + 12CaSO_4 + 6(SiF_4 2NH_3) + 16H_2O + 20NH_3$

(10) $Al_2O_3 + Na_2SO_4 + 3(NH_4)_2SO_4 = Na_2SO_4.Al_2(SO_4)_3 + 3H_2O + 6NH_3$

Likewise in Example I sulfuric acid may be substituted for the part of the ammonium sulfate used in the formation of aluminum sulfate.

*Example IV*

Pulverized orthoclase is mixed with ammonium fluoride sufficient to convert the silicate silica content into silicon diammino tetra-fluoride ($SiF_4 2NH_3$). The mixture is heated to 230° C. or higher. Ammonia, water and silicon diammino tetra-fluoride are liberated and volatilized. The silicon diammino tetrafluoride is condensed. The water and ammonia are collected separately and are treated as described above.

An appropriate amount of sulfuric acid or ammonium sulfate or bisulfate is added to the residue to convert the metallic compounds into sulfates and the temperature is maintained substantially unchanged. The remaining silica is converted into volatile compounds which are worked up in the same way as described above. The sulfate residue is lixiviated with water, filtered from unattacked quartz and other insoluble matter. The filtrate is concentrated if necessary and potassium alum is crystallized out. If the orthoclase does not contain sufficient potassium to yield all the aluminum sulfate in the form of alum, a suitable quantity of potassium sulfate may be added before crystallization. An amount of potassium sulfate equivalent to the sodium sulfate content should be added if it is desired to obtain a maximum yield of potash alum.

Example V 1000 lbs. of finely divided dry clay, containing about 30% alumina, 2% ferric oxide, 3% alkali metal oxides and 56% silica are heated in an atmosphere of steam or in other inert or reducing gas to a temperature of about 350 to 400° C. in order to reduce ferric compounds to ferrous.

The finely divided clay is then mixed with 1554 lbs. of ammonium sulfate, 24 lbs. of sulfuric acid and 1370 lbs. of ammonium fluoride. Considerable heat is generated and ammonia and water vapors are evolved.

The mixture is further heated under constant stirring for 2-3 hours at about 250° C. The vapors evolved consisting principally of silicon diammino tetrafluoride, ammonia and water vapor are partially condensed whereby the silicon diammino tetrafluoride is separated from the ammonia and water vapor. Part of the ammonia is absorbed in water to be used for precipitation of silica and regeneration of ammonium fluoride from the silica diammino tetrafluoride, while another part is retained in the gaseous state to be used in the conversion of aluminum sulfate into aluminum hydrate.

The sulfate residue is lixiviated in 900 gallons of hot water and filtered hot to prevent crystallization of alum, and the residue is washed. The clear filtrate is cooled, alum crystallized out under constant stirring and dried in a centrifugal drier. The mother liquor, about 570 gallons, together with wash water from lixiviation residue is used in lixiviation of new batches of sulfates. The alum crystals are converted into aluminum hydroxide and ammonium (and alkali) sulfate by action of ammonia gas, obtained from the first part of the process. As considerable heat is evolved, cooling is advisable.

I claim:

1. The method of producing an alum which consists in heating material containing an alum-forming trivalent metal, silica, and a basic substance capable of yielding a monovalent sulfate, with ammonium fluoride in the absence of water in the liquid state to form volatile ammonia silicon fluorine compounds and with reactive sulfates to produce sulfates of said trivalent and monovalent bases, volatilizing said volatile ammonia silicon fluorine compounds and extracting alum from the residue.

2. The method of producing alums which consists in heating material containing alumina, silica and a monovalent basic substance capable of yielding an alum-forming sulfate, with ammonium fluoride in the absence of water in the liquid state to form volatile ammonia silicon fluorine compounds and with reactive sulfates to produce sulfates of aluminum and said basic substance, volatilizing said volatile ammonia silicon fluorine compounds and extracting alum from the residue.

3. The method of producing alums which consists in heating material containing alumina, silica and a monovalent basic substance capable of yielding an alum-forming sulfate, with reactive sulfates and ammonium fluoride in the absence of water in the liquid state, to volatilize ammonia silicon fluorine compounds, lixiviating the residue with water and crystallizing alum from the solution.

4. The method of forming alums which consists in heating a mixture containing alumina, silica, a compound of a monovalent alum-forming metal, ammonium fluoride and reactive sulfates in the absence of water in the liquid state, to form and volatilize volatile ammonia-silicon-fluorine compounds and to form sulfates of alumina and of said monovalent alum-forming metal, extracting the residue and crystallizing alum therefrom.

5. The method for the production of an alum from a silicious oxygen compound containing an alum-forming, trivalent metal, which comprises subjecting said compound to the action of ammonium fluoride and heating the reaction mass in the absence of liquid water to volatilize silicon diammino-tetra fluoride therefrom, and heating the residue with a reactive sulfate in the quantity needed to form the trivalent component of the double sulfate in the presence of a sufficient quantity of a monovalent sulfate to form the alum.

6. The method for the production of an alum from a silicious oxygen compound containing an alum-forming, trivalent metal, which comprises subjecting said compound to the action of dry ammonium fluoride crystals and heating the reaction mass in the dry way to volatilize silicon diammino tetrafluoride therefrom, and heating the residue with a reactive sulfate in quantity sufficient to form the trivalent component of the double sulfate in the presence of a sufficient quantity of a monovalent sulfate to form the alum.

7. The method for the production of an alum of alumina from a silicious oxygen compound containing aluminum oxide, which comprises subjecting said compound to the action of ammonium fluoride and heating the reaction mass in the absence of liquid water to volatilize silicon diammino tetrafluoride therefrom, and heating the residue with a reactive sulfate in quantity sufficient to form aluminum sulfate in the presence of a sufficient quantity of a monovalent sulfate to form the alum.

8. The method for the production of an alum of alumina from a silicious oxygen compound containing aluminum oxide but low in silica, which comprises subjecting said compound to the action of an excess of ammonium fluoride, heating the reaction mass in the absence of liquid water to volatilize silicon-fluorine-ammonia compounds therefrom, and heating the residue with ammonium sulfate in quantity sufficient to form aluminum sulfate in the presence of a sufficient quantity of a monovalent sulfate to form the alum.

9. The method for the production of an ammonium alum from a silicious oxygen compound containing an alum-forming, trivalent metal, which comprises subjecting said compound to the action of ammonium fluoride, heating the reaction mass in the absence of liquid water to volatilize silicon diammino tetrafluoride therefrom, and heating the residue with ammonium sulfate in quantity sufficient to form the trivalent component of the double sulfate in the presence of sufficient additional ammonium sulfate to form the alum therewith.

10. The method for the production of crystallized ammonium aluminum alum from a silicious oxygen compound containing aluminum oxide, which comprises heating said compound with ammonium fluoride in the dry state and volatilizing silicon diammino tetrafluoride therefrom, heating the residue with ammonium sulfate in the quantity needed to form aluminum sulfate and additional ammonium sulfate to form the alum therewith, lixiviating the reaction mass with water, filtering the resulting solution, reducing the ferric iron to ferrous iron in said solution, and crystallizing the alum therefrom.

11. The method for the production of ammonium aluminum alum from a silicious oxygen compound containing aluminum oxide, which comprises subjecting said compound to the action of ammonium fluoride, heating the reaction mass in the dry state to volatilize silicon diammino tetrafluoride therefrom, and heating the residue with ammonium sulfate in the quantity needed to form aluminum sulfate and additional ammonium sulfate to form the alum therewith.

12. The method for the production of an alum of alumina from a clay which comprises calcining said clay at a suitable temperature to make it more reactive, subjecting said calcined clay to the action of ammonium fluoride, heating the reaction mass in the dry state to volatilize silicon diammino tetrafluoride therefrom, and heating the residue with a reactive sulfate in the quantity needed to form aluminum sulfate in the presence of a sufficient quantity of a monovalent sulfate to form the alum.

13. The method for the production of ammonium aluminum alum from a clay which comprises calcining said clay at from about 375° to 900° C., subjecting the calcined clay to the action of ammonium fluoride, heating the reaction mass in the dry state to volatilize silicon diammino tetrafluoride therefrom, heating the residue with a reactive sulfate in quantity sufficient to form aluminum sulfate and with additional ammonium sulfate to form the ammonium alum therewith.

14. The method for the production of an aluminum alum from bauxitic clay low in silica, which comprises calcining said bauxitic clay at from about 375° C. to 600° C., subjecting said calcined bauxite to the action of an excess of ammonium fluoride, heating the reaction mass in the dry state to volatilize silicon-fluorine-ammonia compounds therefrom, and heating the residue with ammonium sulfate in quantity sufficient to form aluminum sulfate and additional monovalent sulfate to form the alum therewith.

15. The method for the production of ammonium aluminum alum from bauxitic clay which comprises calcining said bauxitic clay at from about 375° C. to 600° C., subjecting said calcined clay to the action of ammonium fluoride and heating the reaction mass in the dry state to volatilize silicon diammino tetrafluoride therefrom, heating the residue with ammonium sulfate in quantity sufficient to form aluminum sulfate and additional ammonium sulfate to form the alum therewith.

16. The method for the production of an alum of aluminum from a clay which comprises mixing and heating said clay with fluorspar and ammonium sulfate at about 280° C. to 350° C. to form and volatilize silicon diammino tetrafluoride therefrom, and heating the residue with a reactive sulfate in quantity sufficient to form aluminum sulfate in the presence of a sufficient quantity of a monovalent sulfate to form the alum.

17. The method for the production of an alum solution from a silicious oxygen compound containing an alum-forming trivalent base which comprises subjecting said compound to the action of ammonium fluoride and heating the reaction mass to above about 230° C. to volatilize silicon diammino tetrafluoride therefrom, heating the residue with a reactive sulfate in quantity sufficient to form the trivalent component of the double sulfate in the presence of a sufficient quantity of a monovalent sulfate to form the alum, adding water to the resulting mass to dissolve the alum, and filtering the resulting solution.

18. The method for the production of a substantially iron-free solution of an alum of aluminum from a silicious oxygen compound containing iron oxide and aluminum oxide, which comprises subjecting said compound to the action of ammonium fluoride and heating the reaction mass in the dry state to volatilize silicon diammino-tetrafluoride therefrom, heating the residue with a reactive sulfate in the quantity needed to form aluminum sulfate in the presence of a sufficient quantity of a monovalent sulfate to form the alum, adding water to the resulting mass to dissolve the alum, filtering the resulting solution, precipitating the iron from said solution by means of a ferro-cyanide onto a precipitated hydrated silica, and filtering the resulting prussiate silica lake from said solution.

19. In the production of aluminum sulfate compounds from products derived by sulfating silicous compounds containing alumina and eliminating silicon from the sulfated products, said products containing insoluble solids of colloidal character, leaching such sulfated products with hot water to dissolve the aluminum sulfate compound, cooling the resulting solution with its accompanying colloidal solids, thereby crystallizing the sulfate compound while agitating the crystallizing mixture, thereby preventing occlusion of colloidal solids within the forming crystals, and washing the latter to remove mother liquor and accompanying colloidal impurities.

20. The method for the production of a substantially iron-free solution of an alum of aluminum from a silicious oxygen compound containing iron oxides and aluminum oxide, which comprises subjecting said compound to the action of ammonium fluoride and heating the reaction mass in dry state to volatilize silicon-ammonia-fluorine compounds therefrom, heating the residue with a reactive sulfate in the quantity needed to form aluminum sulfate in the presence of a sufficient quantity of a monovalent sulfate to form the alum, adding water to the resulting mass to dissolve the alum, subjecting the resulting solution to the action of aluminum whereby any iron present is maintained in ferrous state, filtering the resulting solution, precipitating the iron from said solution by means of a ferro-cyanide onto a precipitated hydrated silica, and filtering the resulting prussiate silicate lake from said solution.

21. The method of purifying a solution of a water-soluble aluminum salt containing soluble iron which comprises adding a soluble ferrocyanide thereto in the presence of precipitated hydrated silica.

22. The method of purifying a solution of an aluminum sulfate compound containing soluble iron which comprises adding thereto a precipitated hydrated silica and a soluble ferro-cyanide, thereby precipitating the iron as a ferro-cyanide lake.

SVEND S. SVENDSEN.

Certificate of Correction

Patent No. 2,022,012.    November 26, 1935.

SVEND S. SVENDSEN

It is hereby certified that errors appear in the printed specification of the above numbered patent requiring correction as follows: Page 2, first column, line 21, strike out the words and syllable "type and supplied with mixing means, the am-" and insert instead the words *compound, it is volatilized as a titanium fluoride;* page 3, first column, line 53, last line of equation, after the parenthesis and before "16H$_2$O" insert a plus sign; page 4, first column, line 20, for the misspelled word "partically" read *partially;* and that the said Letters Patent should be read with these corrections therein that the same may conform to the record of the case in the Patent Office.

Signed and sealed this 31st day of December, A. D. 1935.

[SEAL]

LESLIE FRAZER,
*Acting Commissioner of Patents.*